United States Patent [19]

Siegenthaler

[11] Patent Number: 4,877,468
[45] Date of Patent: Oct. 31, 1989

[54] HOT TIRE FORMING METHOD
[75] Inventor: Karl J. Siegenthaler, Rome, Italy
[73] Assignee: The Firestone Tire & Rubber Company, Akron, Ohio
[21] Appl. No.: 51,436
[22] Filed: May 18, 1987
[30] Foreign Application Priority Data May 20, 1986 [IT] Italy .............................. 67 413-A/86

[51] Int. Cl.⁴ ........................ B29C 35/02; B60C 9/00
[52] U.S. Cl. .................................. 156/111; 156/124; 156/126; 156/133; 156/243; 156/244.18; 264/148; 264/152; 264/171; 425/31; 425/34.1; 425/38; 425/41
[58] Field of Search ............... 156/123, 111, 124, 126, 156/128, 64, 130, 130.5, 133, 243, 244.11, 244.18, 244.22, 244.25, 244.26, 245, 396, 405.1, 406.2, 406.4, 414, 421.4, 421.6; 264/148, 149, 171, 152, 294–296, 349, 326, 297.6; 425/28 R, 29, 30, 31, 88, 35, 34 R, 34 A, 40, 41, 51, 52, 38, 47, 451, 28.1, 34.1, 34.2; 901/6, 7; 364/473, 476

[56] References Cited

U.S. PATENT DOCUMENTS

| | | | |
|---|---|---|---|
| 2,028,078 | 1/1936 | State et al. | 154/10 |
| 2,822,576 | 2/1958 | Rowe, Jr. | 18/18 |
| 2,874,411 | 2/1959 | Berquist | 18/13 |
| 2,970,346 | 2/1961 | Fannen | 18/38 |
| 3,183,135 | 5/1965 | Berquist | 156/126 |
| 3,574,893 | 4/1971 | Balle | 18/17 |
| 3,579,736 | 5/1971 | Balle et al. | 18/17 |
| 3,615,987 | 10/1971 | Blatz | 156/133 |
| 3,958,682 | 5/1976 | Martin | 901/7 X |
| 3,975,109 | 8/1976 | Frazierr | 408/35 |
| 4,134,783 | 1/1979 | Appleby et al. | 156/396 |
| 4,149,926 | 4/1979 | Taylor | 156/96 X |
| 4,180,894 | 1/1980 | Link | 29/36 |
| 4,197,155 | 4/1980 | Hursell, Sr. | 156/396 |
| 4,240,863 | 12/1980 | Vinton | 156/130 X |
| 4,268,330 | 5/1981 | Komatsu et al. | 156/157 |
| 4,283,241 | 8/1981 | Hollmann | 156/117 |
| 4,344,142 | 8/1982 | Diehr, II et al. | 364/473 |
| 4,484,966 | 11/1984 | Kawamoto | 156/126 |
| 4,525,320 | 6/1985 | Sarumaru | 264/502 |
| 4,545,750 | 10/1985 | Sarumaru | 425/32 |

FOREIGN PATENT DOCUMENTS

| | | |
|---|---|---|
| 59-93345 | 2/1984 | Japan ........................ 156/406.4 |
| 251814 | 6/1970 | U.S.S.R. . |
| 596473 | 12/1975 | U.S.S.R. . |
| 442081 | 2/1978 | U.S.S.R. . |
| 2157224 | 10/1985 | United Kingdom . |

Primary Examiner—Michael W. Ball
Assistant Examiner—Thomas Bokan
Attorney, Agent, or Firm—Ernst H. Ruf

[57] ABSTRACT

A hot tire forming method whereby at least some of the elements constituting each tire are formed starting from respective masterbatches, which are mixed with given chemical compounds inside respective continuous mixers to obtain respective final mixes, which are hot-fed to respective continuous production means, such as extruders, for obtaining semifinished products, which are hot-fed onto a green tire building drum, with the completed green tire then being transferred, hot, to a curing department; the transfer from the continuous mixers to the curing department being performed in such a manner as to preserve, inside each green tire entering the curing department, at least part of the initial mixing thermal energy and at least part of the initial continuous production thermal energy.

15 Claims, 9 Drawing Sheets

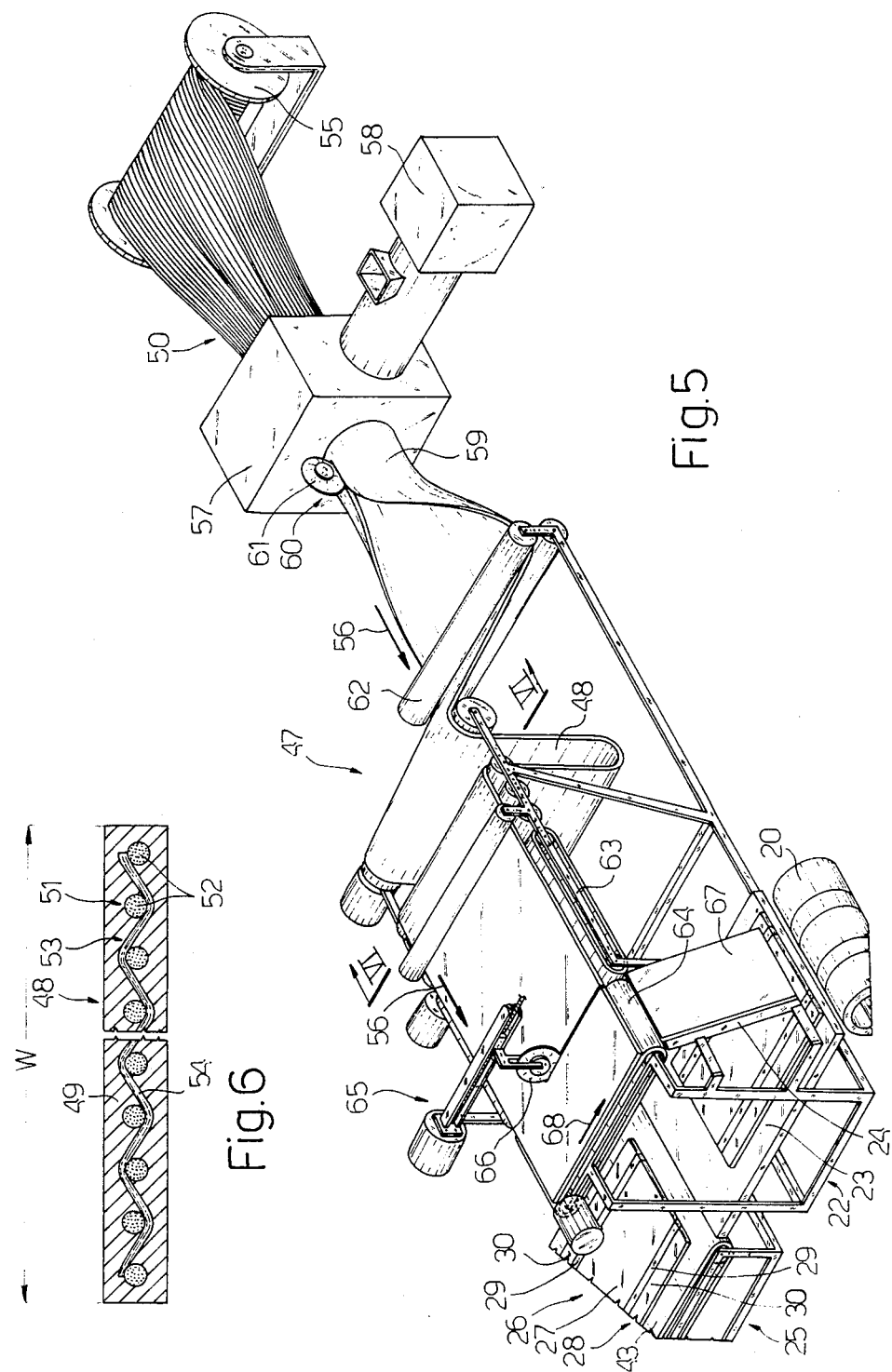

HOT TIRE FORMING METHOD

TECHNICAL FIELD

The present invention relates to a hot tire forming method.

BACKGROUND OF THE ART

A modern tire is known to be formed of numerous elastomeric elements or components with or without internal reinforcement and generally assembled in the green or uncured state.

The said elements generally define two annular packages, of which the first, arranged externally, usually comprises a belt consisting of a number of superimposed tread plies covered externally with a tread, and the second of which, arranged internally, consists of an internal carcass usually comprising an impermeable innerliner, an outer body ply, two metal annular beads with respective outer fillers, two sidewalls, and two abrasion strips, each of which is inserted between the innerliner and a respective sidewall and folded so as to cover a respective bead.

All the aforementioned elements present respective chemical characteristics specially designed to enable each to perform its own specific function as efficiently as possible. Consequently, each of the said elements usually consists of a specific final mix usually formed from a specific masterbatch.

In tire manufacturing plants, each masterbatch is usually formed by means of internal mixers, mainly of the BANBURY type, the chief function of which is to incorporate ingredients, such as carbon black, into the rubber with maximum possible dispersion.

An internal mixer of the aforementioned type is usually employed for mixing relatively heavy batches, each of which is heated as a result of the mechanical action it is subjected to inside the mixer, and then cooled, usually to room temperature, prior to being fed into extruders where it is converted into slabs, strips, pellets or any other suitable form enabling both storage and subsequent processing of the resulting masterbatch.

The aforementioned operations also, obviously, involve heating, as a result of mechanical action, and subsequent cooling.

Each masterbatch is then further processed, usually by means of continuous mixers, to obtain a specific final mix. For this purpose, curatives or crosslinking agents and other chemical compounds are added to the masterbatch to give the said final mix the required chemical-physical characteristics. The final mix is also usually produced in slabs, strips, pellets or any other appropriate form enabling both storage and subsequent processing.

In this case also, the mechanical action the masterbatch is subjected to, for obtaining the final mix, involves at least one heating, followed usually by cooling to room temperature.

Each final mix is then processed mechanically, usually by means of extruders or calenders, to obtain continuous strips, which are usually stored and later subjected, when actually forming or assembling the tires, to cutting operations. Each of the said cutting operations produces, from the said strip, a respective element constituting a portion of a respective tire.

The mechanical processing for producing the said strips also involves at least one heating of the material, usually followed by cooling to room temperature.

Once formed in a known manner, by means of one or more tire building drums, each green tire is usually stored prior to subsequent curing and final inspection.

The above description warrants a number of comments in terms of both cost and functional efficiency.

Firstly, in tire manufacturing plants as of the present, production clearly involves considerable consumption and waste of thermal energy, by virtue of each tire component element being the finished product of a series of processing cycles, each of which involves heating and subsequent cooling.

During each of the said cycles, in fact, the material being processed is brought up to a temperature of usually no more than 120° C., to avoid scorching, and then cooled to room temperature, whereas the finished green tire is brought up to around 200° C. during the curing stage.

Secondly, owing to the relatively large size of the batches treated each time by the said internal mixers, each of the said processing cycles is followed by storage of resulting product. In known plants, this involves not only relatively extensive storage space, with personnel and facilities for controlling and transferring stock, but also a relatively long time lapse between inspection of the finished tire and initial utilization of the base components forming the respective masterbatches. This time lapse, which in relatively extensive known types of plants may be as long as several weeks and even up to one month, may have extremely critical repercussions. For example, a formulation error in the masterbatch of one of the component elements on the tire may only be detected at the finished tire inspection stage, with the result that all the finished tires in which that particular element has been utilized, from that given masterbatch may have to be rejected, and all subsequent batches of the same type and possibly presenting the same error may have to be rejected or recycled.

Furthermore, in known plants of the aforementioned type, storing the various finished and semifinished elements results, not only in inconsistent aging of the elements themselves and, therefore, inconsistent production quality, but also in the green tire having to be assembled at room temperature.

DISCLOSURE OF THE INVENTION

The aim of the present invention is to provide a tire manufacturing method designed to eliminate, at least in part, the aforementioned drawbacks intrinsic in known types of tire manufacturing plants.

According to the present invention, there is provided a method of hot-forming tires comprising a number of component elements, each formed at least partially from a respective final mix of elastomeric material, the said component elements defining an internal carcass and an external annular package assembled together in a green tire assembly department comprising at least one tire building drum, the said carcass comprising an impermeable inner layer and at least one outer body ply, and the said external annular package comprising a number of superimposed tread plies and an outer tread; the method being characterized by the fact that it comprises stages consisting in:

forming at least some of the said elements by transversely cutting semifinished products, each in the form of a respective continuous strip produced by direct continuous production methods, including but not limited to extrusion, for example, of the respective said final mix, the said production operation involving a given transfer of thermal energy to each said continuous strip and conferring to the same an output temperature greater than room temperature;

hot-feeding at least some of the said produced and cut continuous strips directly onto the said tire building drum for assembling onto the same a finished green tire, which preserves at least part of the said production thermal energy of its said component elements and produces a total final temperature greater than room temperature;

subjecting each said finished green tire to a curing operation prior to dissipation of the said production thermal energy.

At least some of the said final mixes are preferably formed by mixing respective masterbatches with respective chemical components inside respective mixers, preferably continuous mixers, the said mixing operation involving a given transfer of thermal energy to each said final mix and conferring to the same, as it comes out of the respective said mixer, a temperature greater than room temperature; each said final mix being hot-fed to the next respective production operation prior to dissipation of the said mixing thermal energy.

The present invention will be described by way of example with reference to the accompanying drawings.

BRIEF DESCRIPTION OF THE DRAWINGS

FIG. 4 shows a section along line IV—IV in FIG. 3;

FIG. 5 shows an enlarged view in perspective of a second processing line in the FIG. 2 department;

FIG. 6 shows a section along line VI—VI in FIG. 5;

BEST MODE FOR CARRYING OUT THE INVENTION

Figure 1:
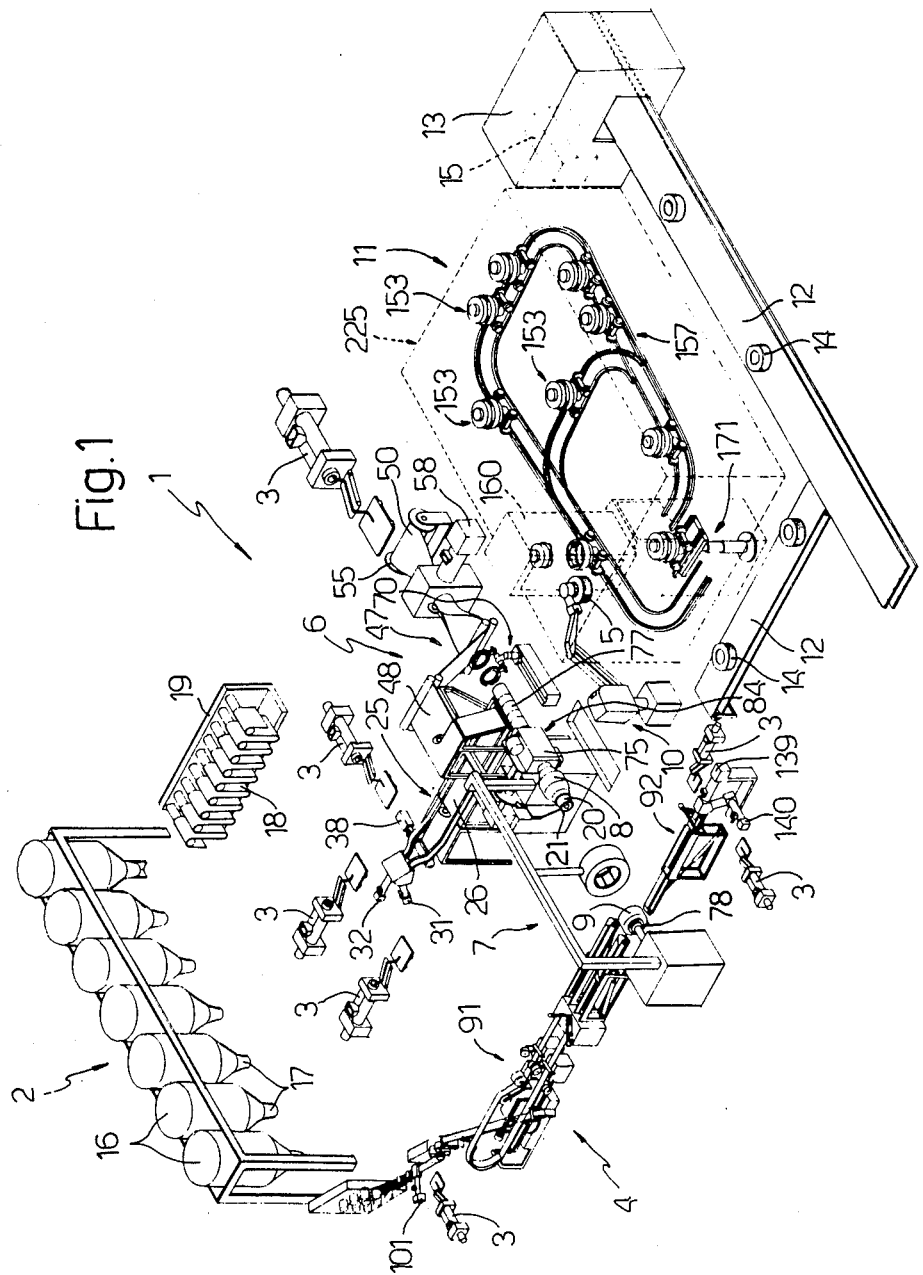
FIG. 1 shows a schematic view in perspective and partial block diagram of a tire manufacturing plant embodying the method according to the present invention.

Number 1 in FIG. 1 indicates a tire manufacturing plant including a storage area 2 for storing a plurality of masterbatches, generally in the form of pellets and/or strips, and a number of curatives or crosslinking agents and other chemical compounds, generally in the form of pellets and/or powder and designed to mix with the said masterbatches for obtaining a number of final mixes.

Plant 1 also includes a plurality of continuous mixers 3, each of which is designed to receive, at the input, a respective one of said masterbatches and a respective combination of the said curatives and chemical compounds, for producing, at the output, a given respective final mix.

Plant 1 also includes a department 4 for assembling green tires 5, a detailed description of at least a portion thereof is set forth in co-pending U.S. patent application Ser. No. 050,801 filed by the Assignee of the present invention concurrently herewith and which is incorporated herein by reference in the interest of full disclosure.

Department 4 is divided into two sections 6 and 7, the former for producing first stage tires or internal carcasses 8, and the latter for producing external annular packages 9 and completing, by means of the said annular packages 9, the said carcasses 8 for producing finished green tires 5. The output of assembly department 4 is connected, by means of a transfer device consisting, in the example shown, of a robot 10, to a curing department 11 a detailed description of which is set forth in co-pending U.S. patent application Ser. No. 050,661 now U.S. Pat. No. 4,728,274 filed by the Assignee of the present invention concurrently herewith and which is incorporated herein by reference in the interest of full disclosure.

The output of department 11 is connected, by means of a transfer device consisting, in the example shown, of a robot 10 and a conveyor belt 12, to an inspection department 13 inside which finished tires 14 are subjected to a series of inspections prior to being sent to a finished tire storage area (not shown).

Finally, plant 1 includes a computerized central control unit 15 for controlling storage area 2, assembly department 4 and curing department 11. In the example shown, control unit 15 is located in inspection department 13 and is designed to receive, from inspection department 13, data for modifying, if necessary, any processing cycle performed in plant 1, for the purpose of eliminating any detected errors.

As shown in FIG. 1, storage area 2 includes a number of vertical containers 16, each having a respective bottom output feedbox 17 usually provided with a known type of weighing device (not shown) and usually controlled by central control unit 15.

Each of containers 16 is designed to contain either a respective masterbatch, e.g. in pellet form, or a respective curative or respective chemical compound, e.g. in powder or pellet form.

Should one or more masterbatches be supplied in the form of continuous strips 18, storage area 2 also includes supporting carriages 19 (only one of which is shown) for the said strips 18.

As shown in FIGS. 1, 2, 3 and 5, assembly department 4 includes a tire building drum 20 consisting, in this case, of a known type of unistage drum. Drum 20 is mounted on a powered shaft 21 set up horizontally and coaxial with drum 20.

Figure 3:
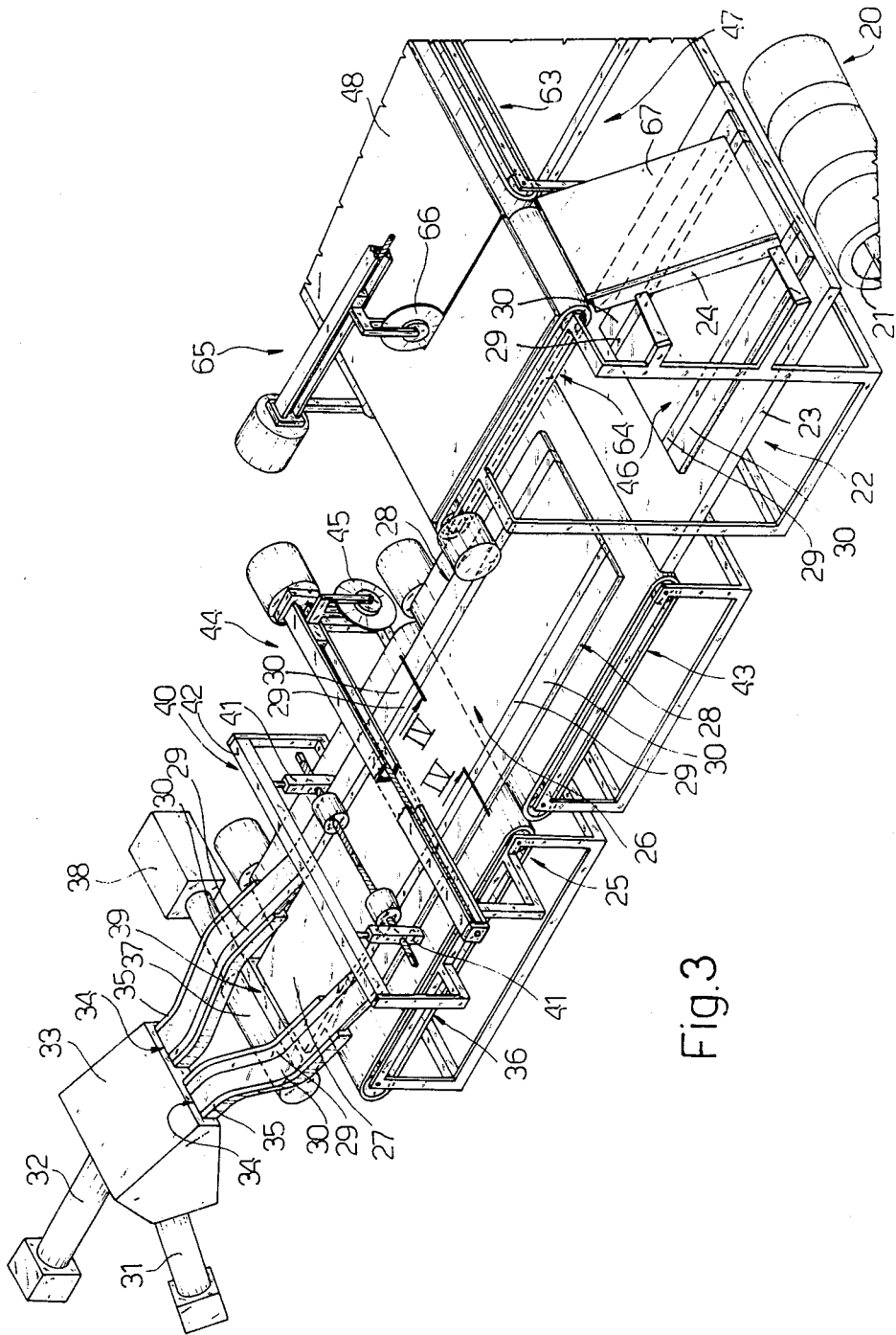
FIG. 3 shows an enlarged view in perspective of a first processing line in the FIG. 2 department.

As shown, particularly in FIGS. 3 and 5, section 6 of assembly department 4 also includes a known type of server or dispensing device 22 located behind drum 20 and including two superimposed tables 23 and 24 inclined differently, both located parallel with shaft 21, extending in directions substantially tangent with drum 20, and having free edges facing and located a given distance from the rear periphery of drum 20.

As shown, in particular, in FIG. 3, lower table 23 constitutes the end portion of a line 25 for forming, assembling and supplying an assembled elastomeric strip 26 substantially equal in width to the axial development of carcass 8. Strip 26 is comprised of a central portion, consisting of an innerliner 27 usually of butyl rubber, and two lateral portions 28. Each portion 28 in turn is comprised of two strips 29 and 30, of which the first is located internally and consists of an abrasion strip of elastomeric material, whereas the second is located externally and consists of a sidewall portion of a further elastomeric material.

Line 25 extends in a direction substantially perpendicular to the axis of drum 20 and includes two superimposed extruders 31 and 32, which are fed by respective continuous mixers 3. Extruder 31 is used to form two abrasion strips 29, whereas extruder 32 is used to form two sidewalls 30.

Both extruders 31 and 32 supply a single extrusion head 33 having two spaced dies 34 from each of which is produced, during operation, a lateral portion 28 consisting of abrasion strip 29 and sidewall 30 which are prespliced together as they emerge, side by side, from each respective die 34.

Dies 34 are connected to respective downward-sloping, converging channels 35 terminating on an assembly table or conveyor 36 and separated by a distance substantially equal to the width of innerliner 27.

Underneath channels 35, there is located an extrusion head 37 of a third extruder 38 fed by a respective continuous mixer 3. A die 39 of extruder 38 is located substantially level with conveyor 36 and supplies innerliner 27 onto the same, below and between lateral portions 28.

As they travel along conveyor 36, innerliner 27 and lateral portions 28 are laterally spliced together by a splicing device 40 located transversely over conveyor 36 and comprising two lateral assembly blocks 41 spaced apart by an adjustable distance equal to the width of strip 26, and movably mounted on a fixed crosspiece 42. Both blocks 41 engage the outer side edges of lateral portions 28 which they push into contact with the side edges of innerliner 27 while, at the same time, complying with any axial distortion of innerliner 27.

According to a not shown variation, extruders 31 and 32 are completely separated from each other; accordingly, extrusion head 33 is not required, and the two abrasion strips 29 and the two sidewalls 30 ar separately supplied onto conveyor 36, and are assembled thereon together and with innerliner 27 by splicing device 40.

The output end of conveyor 36 faces the input end of a conveyor 43 to which the front end of strip 26 is supplied by passing through a cutting station 44 located between conveyors 36 and 43, and including a cutting blade 45 which cuts strip 26 transversely into pieces substantially equal in length to the circumferential development of drum 20. Conveyor 43 travels initially at the same speed as conveyor 36, in such a manner as to receive a front piece of strip 26, and, after cutting, accelerates so as to carry off cut piece 46 and feed it on to table 23.

Table 24, located above table 23, constitutes the end portion of a line 47 for supplying a rubber-coated textile strip 48 the width "W" of which is substantially equal to the circumferential development of drum 20.

The above term "substantially equal" is taken to mean that the said width "W" exceeds the circumferential development of a cylinder, said cylinder being equal in diameter to drum 20 increased by the thickness of strip 26, and by the amount required for overlapping and splicing together the opposite side edges of strip 48.

As shown in FIG. 6, coated textile strip 48 is obtained by coating each side of a textile strip 50 (FIG. 5), substantially equal in width to the circumferential development of drum 20, with a respective layer 49 of elastomeric material. Textile strip 50 comprises an axial warp 51, consisting of parallel textile cords 52 of relatively high tensile strength and evenly spaced along the width of textile strip 50, and a transverse weft 53 consisting of transverse yarns 54. The tensile strength of yarns 54 is the minimum compatible with their function of mutually securing in place axial cords 52 during a series of known processing operations to which cords 52 are subjected prior to being coated with elastomeric material.

As shown, in particular, in FIG. 5, the noted coating is obtained by winding textile strip 50 off a coil 55, and by folding it transversely in such a manner as to form a hose or tube which is fed, in the direction of an arrow 56 parallel with the axis of rotation of drum 20, through a tubular head 57 on an extruder 58 fed by a respective continuous mixer 3 (FIG. 1). Inside head 57, textile strip 50 is coated with two rubber layers 49 and comes out of head 57 in the form of a continuous rubber-coated hose 59 the inside diameter of which is substantially equal to the outside diameter of drum 20.

Hose 59 is fed, still in the direction of arrow 56, through a cutting station 60 wherein it is subjected, by blade 61, to a preliminary cutting operation along its generating line. Once cut axially, hose 59 is flattened out, by means of a flattening roller 62, into coated textile strip 48.

The term "textile" as used herein is deemed to be inclusive of any fiber, be it organic, artificial, and of any composition including, but not limited to, glass, steel, or aramid, for example.

Coated textile strip 48 may be obtained from textile strip 50 in other ways such as, for example, those described in the aforementioned co-pending U.S. patent application No. 050,801.

Line 47 includes a conveyor 63 designed to receive coated textile strip 48 and to feed the free end of coated textile strip 48 in the direction of arrow 56, through a cutting station 65 and on to a further conveyor 64.

Conveyor 64 is located directly over an end section of line 25 and cutting station 65 is located between conveyors 63 and 64 and comprises a blade 66 designed to move transversely in relation to the travelling direction of conveyor 63, and back and forth at a given frequency controlled by unit 15 for cutting coated textile strip 48 transversely into axial portions 67. Said axial portions 67 are then fed one at a time and in step-by-step manner off conveyor 64 and onto table 24, in the direction indicated by arrow 68 (FIGS. 2 and 5), said direction being perpendicular to arrow 56 and parallel with an arrow 69 (FIG. 2), the latter being perpendicular to the axis of drum 20 and indicating the travelling direction of strip 26 along line 25.

Consequently, on conveyor 64 or table 24, each cut portion 67 presents cords 52 arranged transversely in relation to arrow 68, and presents, in the direction of arrow 68, a length substantially equal to the circumferential development of drum 20, and a width which, by adjusting via control unit 15 the cutting frequency of blade 66 to the travelling speed of conveyor 63, equals the width of the body ply of carcass 8 to be formed on drum 20. Consequently, each portion 67 presents the exact dimensions of the body ply of carcass 8, and respective cords 52 lie parallel with the axis of drum 20, thus enabling the said portion 67 to be loaded directly on to drum 20 for forming the body ply of carcass 8.

From the foregoing description, it also follows that each portion 67 involves absolutely no splices, by virtue of its being obtained by transversely cutting continuous coated textile strip 48 which, in turn, is totally free of any transverse splices.

It also follows that feeding coated textile strip 48 along line 47 involves no problems in regard to the structural stability of coated textile strip 48, by virtue of cords 52 in strip 48 lying parallel with arrow 56 and thus providing for highly effective resistance to stretching of strip 48. The same does not apply to known prior art first stage tire manufacturing plants, in which, instead of coated textile strip 48, a composite coated textile strip is used which is obtained by transversely splicing successive strip portions, and which is supplied to the tire building drum in a direction perpendicular to the axis of the same. This composite coated textile strip presents cords arranged transversely in relation to the travelling direction, with the result that the only elements resisting unpredictable local stretching of the composite strip are the said weft yarns which, as already stated, present an extremely low tensile strength. The slightest increase in supply tension therefore results in breakage of the weft yarns and, consequently, local stretching of the composite strip, uneven local distribution of the cords and rejection of any tires produced from locally-stretched parts of the said composite strip.

Finally, from the foregoing description, it further follows that feeding coated textile strip 48 in the direction of arrow 56 parallel with the axis of drum 20 provides for clearing the entire area behind drum 20, thus enabling direct extrusion and full preassembly of strip 26 which may be fed directly on to drum 20 in the direction of arrow 69. Such would not be possible, were the area behind drum 20 to be occupied by a body ply supply line, as in any present first stage tire or carcass manufacturing plant.

Figure 2:
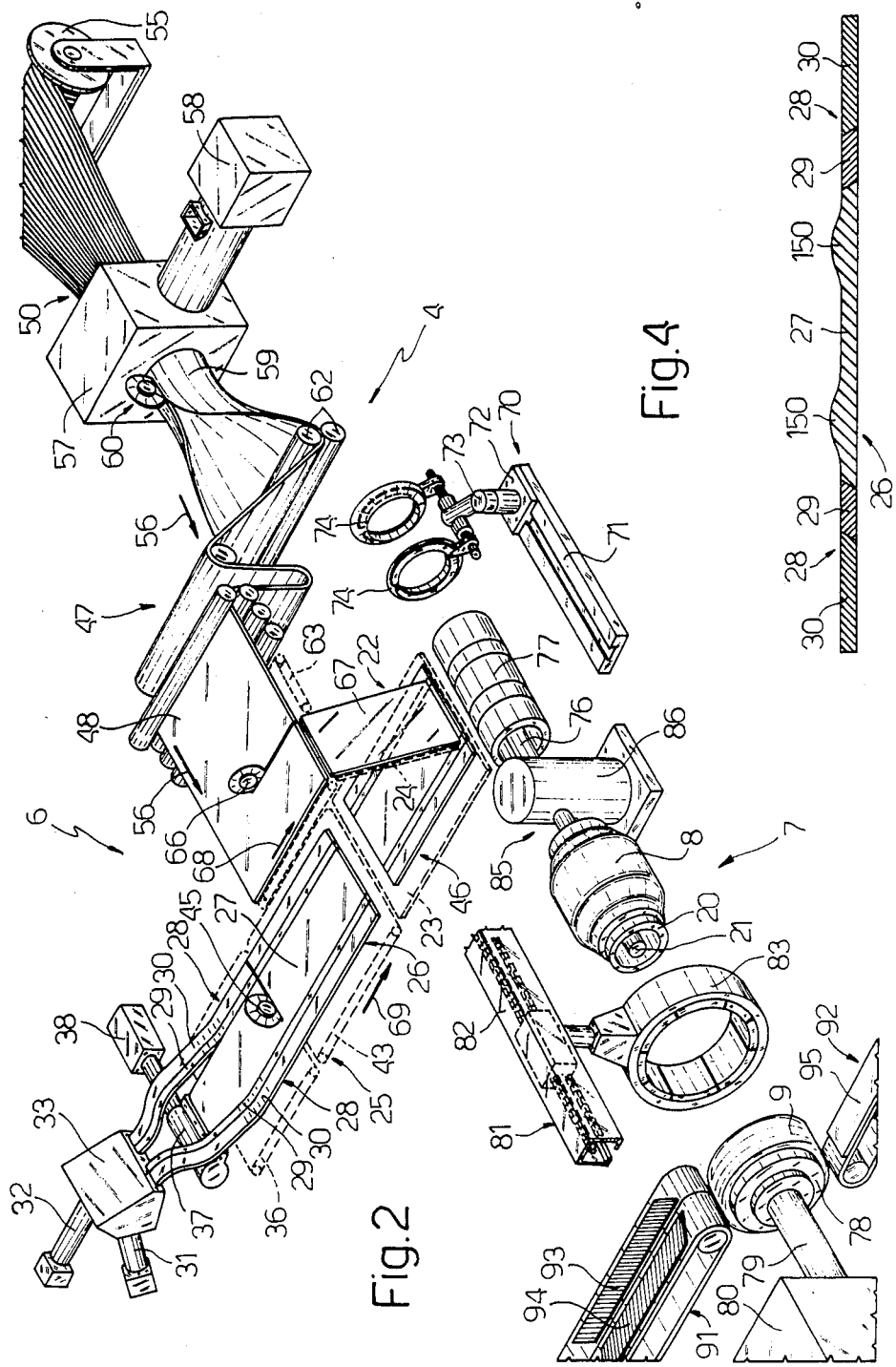
FIG. 2 shows an enlarged view in perspective of a first processing department in the FIG. 1 plant.

As shown in FIGS. 1 and 2, in front of drum 20 there is located a bead feeding unit 70 of a type known in the art and comprising a fixed guide 71 parallel with the axis of drum 20 and supporting a slide 72 designed to move, by virtue of actuating means, not shown, between a working position, wherein slide 72 is arranged facing the center line of drum 20, and an idle position, wherein slide 72 is located beyond the free end of drum 20 facing extruder 58. From slide 72, there extends upwards a column 73 fitted on the top end with a pair of hoops 74 each consisting, at least partly, of ferromagnetic material and arranged with its axis parallel with the axis of drum 20. Hoops 74 are arranged coaxial with each other, and each consists, in a well known manner, of two releasable halves. Each hoop 74 is designed to support a known respective metallic bead (not shown) complete with a respective known bead filler (not shown).

Via actuating means (not shown), hoops 74 may be moved between a lowered working position, wherein hoops 74 are arranged coaxial with drum 20, and a raised idle position, wherein hoops 74 are arranged substantially over column 73.

As shown in FIG. 1, shaft 21 of drum 20 extends horizontally from a vertical platform 75 mounted for rotation in 180° steps about a horizontal axis and forming part of a twin-drum unit 84 a detailed description of which is given in co-pending U.S. patent application Ser. No. 035,679, U.S. Pat. No. 4,753,707 herewith by the Assignee of the present invention and which is incorporated herein by reference in the interest of full disclosure.

Platform 75 is connected to a second shaft 76 (FIG. 2) of a second unistage drum 77 located opposite drum 20 and designed to travel with platform 75, together with drum 20, between sections 6 and 7.

When inside section 7 (FIG. 1), but as best seen in FIG. 2, drum 77 is located facing a known type of collapsible drum 78, a rotary shaft 79 of which projects horizontally from a supporting column 80. Shaft 79 is arranged coaxial with shafts 21 and 76 and is designed to move axially, in known manner, so as to assume two different axial positions in relation to column 80.

By way of an alternative to unit 84, a known type of twin-drum unit 85, as shown by way of example in FIG. 2, may be employed, on which unit shafts 21 and 76 extend in diametrically opposed directions from a turret 86 mounted for rotation about a vertical axis. In this case, tables 23 and 24 are known to be mounted so as to travel, on server 22, to and from the periphery of whichever of drums 20 and 77 is inside section 6. Twin-drum units 84 or 85 and column 80 form the end supports of a portal or superstructure 81 comprising an upper crosspiece 82 parallel with arrow 56 and along which is mounted in sliding manner, and powered by known actuating means (not shown), a slide supporting a transfer ring 83 coaxial with drum 78. Transfer ring 83 is provided, in a known manner, with inner radial grab segments and travels along crosspiece 82 between a position wherein ring 83 is concentric with drum 78, and a position wherein ring 83 is concentric with whichever one of drums 20 and 77 is inside section 7.

As shown in FIGS. 1 and 2, the outer periphery of drum 78 is arranged facing the ends of two lines 91 and 92 extending from opposite sides of drum 78 and substantially perpendicular to the axis of shaft 79, the said line 91 forming outer tread plies 93 and 94, and the said line 92 forming tread 95, which parts are combined to form external annular package 9.

Figure 7:
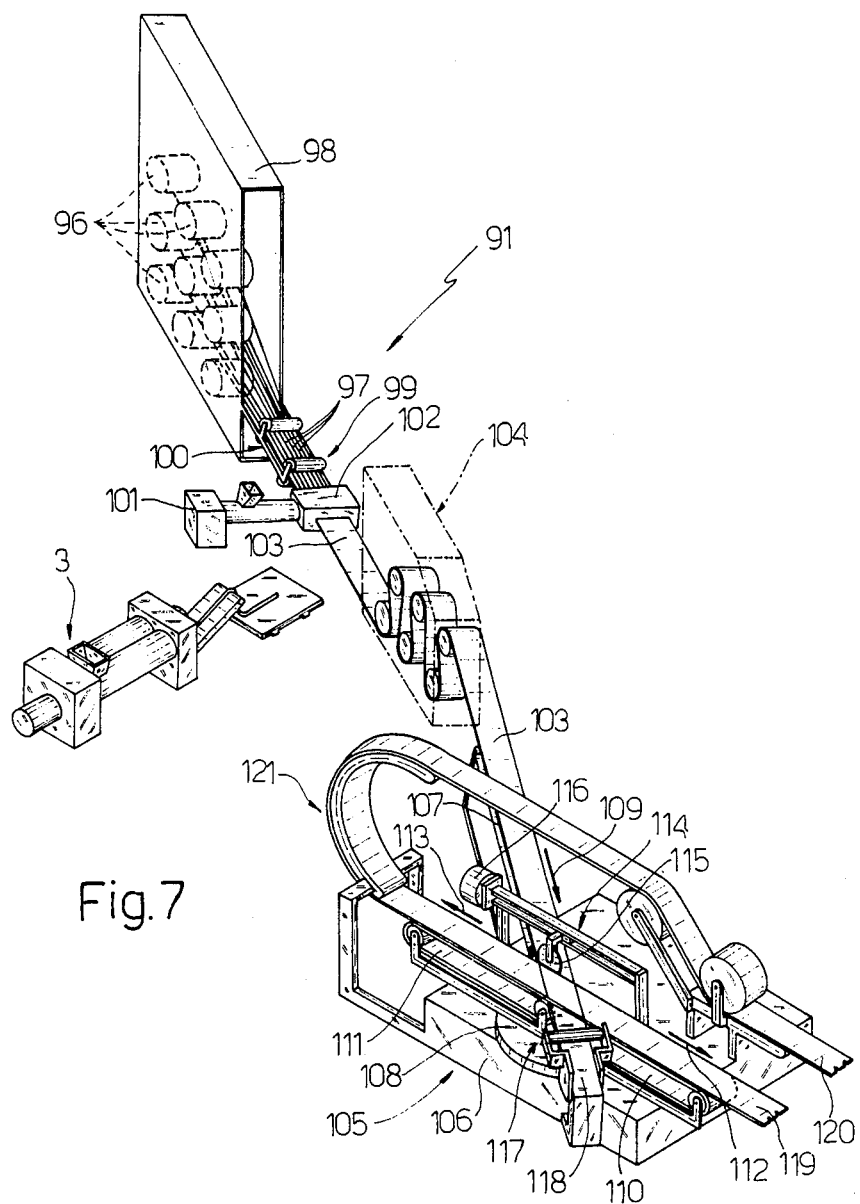
FIG. 7 shows an enlarged view in perspective of a first portion of a third processing line in the FIG. 1 department.

As best seen in FIG. 7, line 91 includes a number of reels 96 of wire 97, usually metal wire, mounted for rotation on a support 98 and from which reels 96 wires 97 are unwound and fed parallel onto an opposed roller bed 99 for forming, on the said bed 99, a continuous strip 100.

Line 91 also includes an extruder 101 fed by a respective continuous mixer 3, and a transverse head 102 through which strip 100 is fed continuously so as to be coated on both sides with layers of elastomeric material for forming a continuous reinforced strip 103 inside which wires 97 extend axially.

Reinforced strip 103 is fed, through a known type of storage system 104, to a known type of cutting and splicing unit 105 including a base 106 supporting a step-by-step input conveyor 107 and a table 108 angularly adjustable, in relation to base 106, about a normally vertical axis perpendicular to the travelling direction of conveyor 107 (shown by arrow 109). Table 108 supports two step-by-step output conveyors 110 and 111 extending from table 108 along the same diameter but in diametrically opposed directions as shown by respective arrows 112 and 113. A cutting device 114 having a rotary blade 115 designed to travel, by virtue of actuator 116, parallel with arrows 112 and 113 is used to cut continuous strip 103 into portions (not shown) the length of which may be controlled by control unit 15 adjusting the step of input conveyor 107. The inclination of the end edges of said portions, in relation to arrow 109, may be adjusted by unit 15 adjusting the angular setting of table 108.

Base 106 also supports a known type of splicing device 117 designed to travel, along a rail 118 parallel with arrow 109, over the incoming portion of conveyor 107 and the out-going portion of conveyors 110 and 111.

In use, alternate portions of continuous strip 103 are laterally spliced to form two reinforced composite strips 119 and 120, which are fed by respective conveyors 110 and 111. Strip 119 is fed directly and strip 120 is fed via a turnover device 121, to a known type of edging device 122 (FIG. 8) having two parallel conveyors 123 with respective pressure rollers 124 for assembly purposes. For each conveyor 123, device 122 also includes at least one pair of reels 125 mounted for rotation on respective supports 126 and each supporting in wound manner a respective strip 127 of elastomeric material for covering a respective side edge of respective reinforced composite strip 119 or 120.

From the output of edging device 122, reinforced composite strips 119 and 120 are fed onto respective conveyors 128, each of which extends through a respective cutting station 129 having a rotary blade 130 designed to travel, via actuator 131, so as to cut respective reinforced composite strip 119 or 120 parallel with wires 97 within each strip. The said cutting operation cuts strips 119 and 120 into portions constituting the outer tread plies 93 and 94 of annular package 9, which portions are fed onto drum 78 by respective conveyors 132 arranged side by side and mounted on a supporting frame 133 in such a manner as to move axially to and from drum 78 by virtue of known actuating means (not shown).

Figure 9:
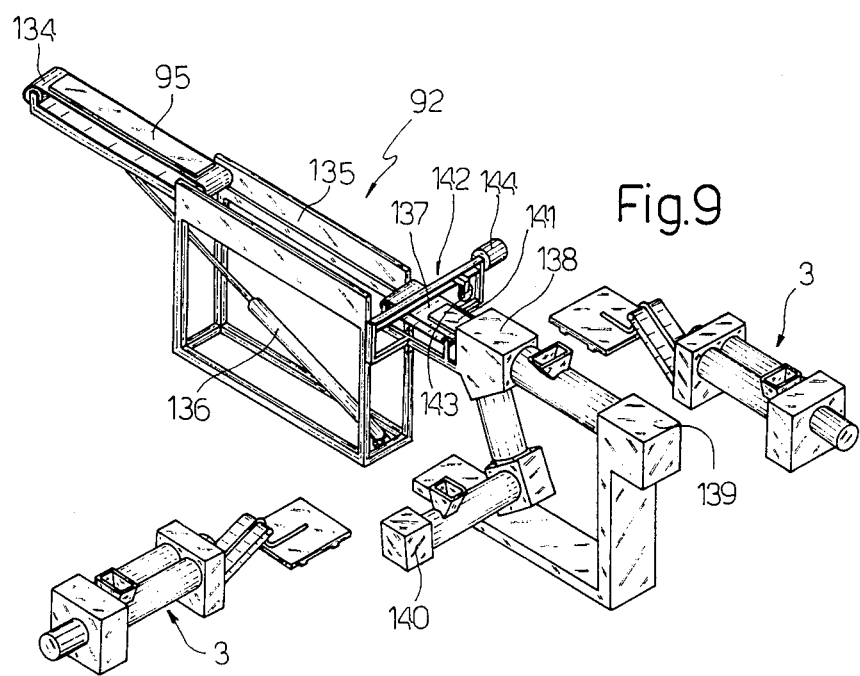
FIG. 9 shows an enlarged view in perspective of a fourth processing line in the FIG. 2 department.

Moving axially between its said two axial operating positions, drum 78 moves into position laterally facing the output end of either of conveyors 132. Also, once set in either of the said two axial positions, drum 78 moves into position laterally facing the end of an output conveyor 134 (FIG. 9) on line 92 supplying tread 95. Conveyor 134 is mounted on a supporting frame 135 so as to move axially, by virtue of actuator 136, between a position contiguous with the periphery of drum 78 and a position contiguous with the output end of conveyor 137. The input end of conveyor 137 is located adjacent to the outlet of an extrusion head 138 supplied by two extruders 139 and 140. These extruders are designed to receive elastomeric material from respective continuous mixers 3 for producing a continuous strip 141 which is cut into portions, each constituting a tread 95 having respective preassembled lateral shoulders (not shown).

Continuous strip 141 is cut in a cutting station 142 located along conveyor 137 and includes a rotary blade 143 designed to travel laterally in relation to the axis of conveyor 137, by virtue of actuator 144.

Figure 10:
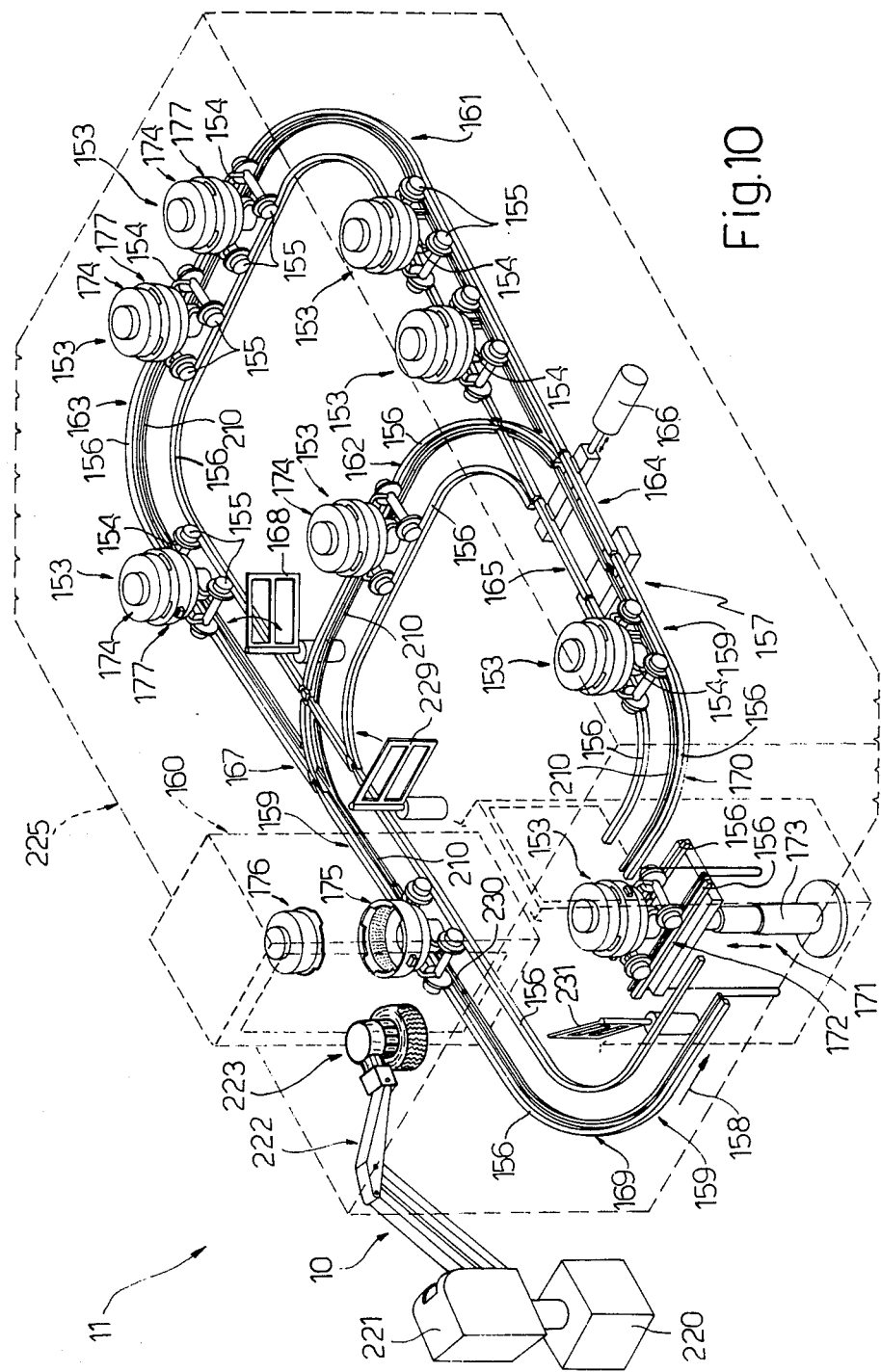
FIG. 10 shows an enlarged schematic view in perspective of a second department in the FIG. 1 plant.
Figure 11:
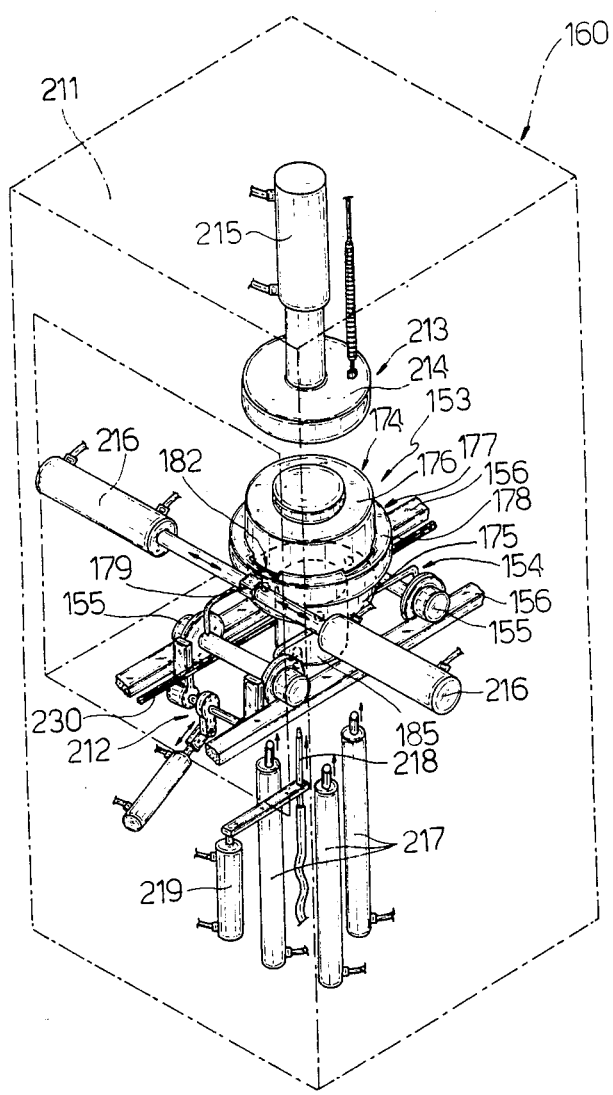
FIG. 11 shows an enlarged schematic view in perspective of a first detail in the FIG. 10 department.
Figure 12:
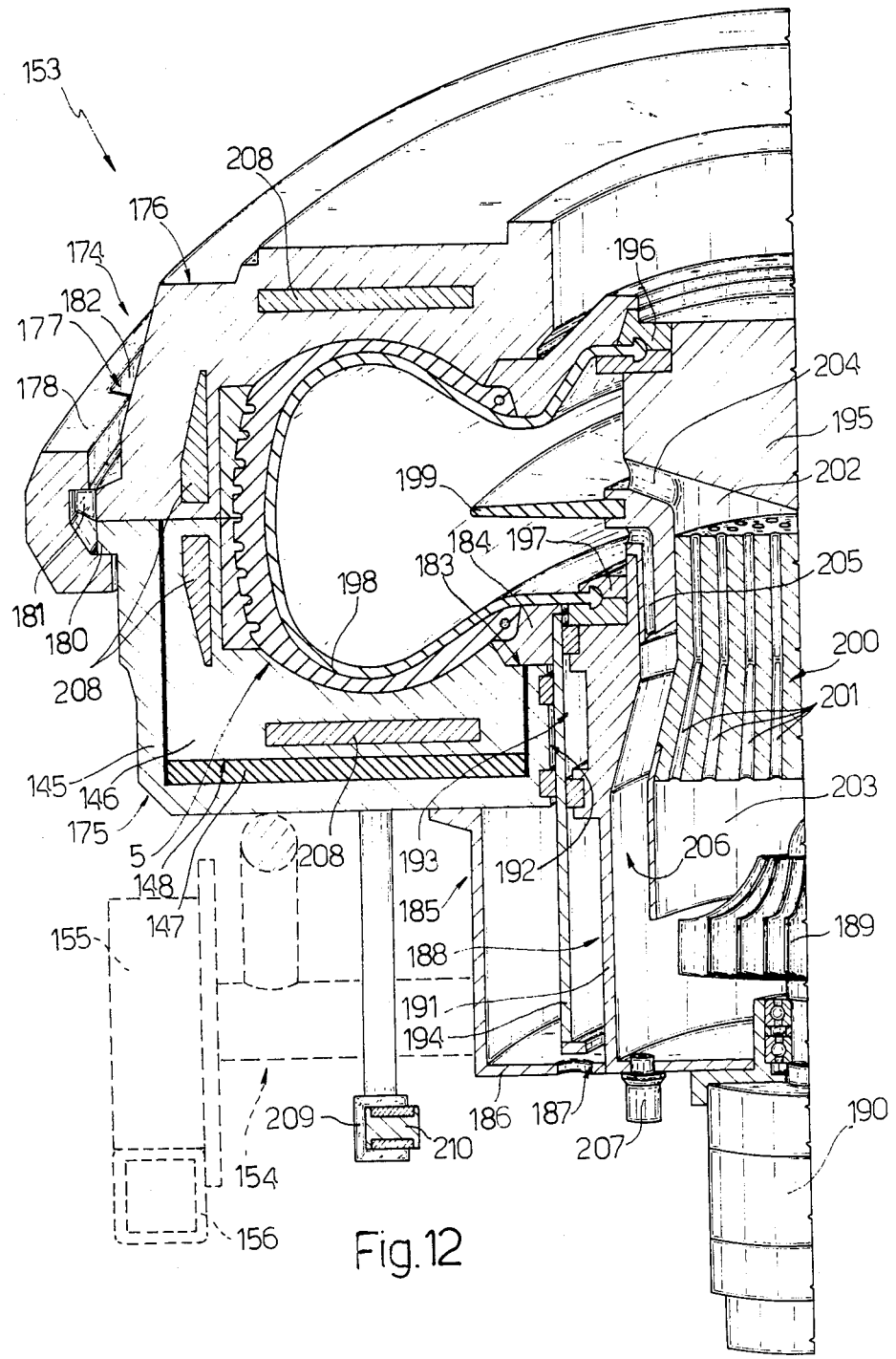
FIG. 12 shows an enlarged half axial section of a second detail in the FIG. 10 department.

As shown in FIG. 1 and, in particular, in FIGS. 10, 11 and 12, curing department 11 includes a plurality of mobile curing units 153, each designed to receive a respective green tire 5.

For a detailed description of curing unit 153, reference should be made to co-pending U.S. patent application Ser. No. 050,660 U.S. Pat. No. 4,747,765 filed by the Assignee of the present invention concurrently herewith and incorporated herein by reference in the interest of full disclosure.

As shown in FIG. 10, each unit 153 is mounted in fixed manner on a respective carriage 154 mounted on rollers 155 enabling carriage 154 to travel along two tubular rails 156 defining a loop path or circuit 157 along which mobile units 153 are fed in the direction indicated by arrow 158.

Circuit 157 comprises a first portion 159, extending through a station 160 for loading green tires 5 and for unloading finished tires 14 on and respectively off respective units 153, and a second circuit portion 161 comprising two branches 162 and 163 arranged in parallel. The upstream end of each branch 162 and 163 in the travelling direction of units 153 is selectively connectable to a downstream end of portion 159 by means of a switching device 164 comprising a rail section 165 designed to move between two different operating positions by virtue of actuator 166. The downstream ends of branches 162 and 163 are connected to the upstream end of portion 159 by means of a three-way intersection 167 controlled by a locking device 168 designed to move selectively between two operating positions, for selectively closing the outlet of either of branches 162 and 163.

As shown in FIG. 10, both branches 162 and 163 slope downwards, and portion 159 of circuit 157 is divided into two downward-sloping sections 169 and 170. In more detail, from intersection 167, section 169 extends downwards through station 160, and presents a downstream end lower than the upstream end of section 170 to which it is connected by a lift 171 supporting a rail section 172 and designed to move vertically between two different operating positions, by virtue of actuator 173.

As shown in FIG. 12, each mobile curing unit 153 comprises a mold 174 consisting of a bottom mold half 175 and a top mold half 176, both annular and interconnected by a bayonet joint 177 in the form of an outer ring 178 surrounding mold 174.

Ring 178 includes an outer extension 179 (FIG. 11) which may be acted on for turning ring 178 about mold 174 and between a locking position, wherein ring 178 locks together, in contacting manner, an outer annular flange 180 on mold half 175 and a number of wedge-shaped teeth 181 extending radially outwards of mold half 176, and an opening position, wherein ring 178 presents slots 182 facing teeth 181, thus enabling axial detachment of mold half 176 from mold half 175.

For ensuring efficient sealing at all times during curing between mold halves 175 and 176, bottom mold 175 is formed in two annular pieces 145 and 146, the first consisting of a cup-shaped outer casing and having an outer annular flange 180, and the second consisting of a torus constituting the bottom mold itself and mounted so as to slide axially inside casing 145 and towards mold half 176 by virtue of flexible compensating member 147 housed inside a variable-volume annular chamber 148 defined between the lower surface of torus 146 and the upper surface of the end wall on casing 145.

In the example shown, flexible member 147 consists of a layer of flexible material which may obviously be replaced, in variations not shown, by set springs or gas under pressure.

On its radial inner edge, mold half 175 presents a top annular groove 183 defining a supporting seat for annular body 184.

To the bottom surface of mold half 175 is connected the top flanged end of a bell 185 coaxial with mold 174. An end wall 186 on bell 185 presents a number of through holes 187 and supports a bottom portion of a substantially cylindrical casing 188.

Casing 188 houses, at the bottom, a fan 189 having a drive motor 190, and has a substantially cylindrical side wall 191, a top portion of which engages, in radially slack manner, a center hole 192 on mold half 175, in such a manner as to define an annular sliding slit 193 for a cylindrical tubular piston 194 the outside diameter of which is smaller than the inside diameter of green tire 5. At the bottom, piston 194 faces holes 187 and is connected, at the top, to annular body 184, which acts as a stop for arresting the downward axial slide of piston 194 and, at the same time, as an extracting element for extracting finished tire 14 from mold half 175.

Side wall 191 is closed at the top by a cap 195, and is fitted over hole 192. The top portion of cap 195 and the top portion of wall 191 are fitted respectively with a top annular fastening element 196 and a bottom annular fastening element 197 for respectively fastening the top and bottom edges of an annular inner tube or curing bag 198, made of elastomer and having a substantially C-shaped radial half section that is designed to expand inside tire 5.

Annular fastening elements 196 and 197 present respective outside diameters smaller than the inside diameter of tubular piston 194, and are separated by a flat annular lip 199 made of elastomer and the inner edge of which is secured to the outer peripheral surface of cap 195.

Casing 188 is fitted with an internal heating element 200 having a number of through axial channels 201 and dividing the space inside casing 188 into a top chamber 202 and a bottom chamber 203. Chambers 202 and 203 communicate with the space inside inner tube 198 via respective rows of holes 204 and 205 formed respectively through the top of wall 191 above lip 199 and through wall 191 below lip 199.

Chamber 203, housing fan 189, defines, together with channels 201, chamber 202, the space inside inner tube 198, and holes 204 and 205, a closed pneumatic circuit 206 for circulating a given supply of heat-exchanging curing media, preferably nitrogen gas, injected externally, at loading station 160, through a supply/exhaust valve 207 mounted through a bottom portion of casing 188.

Molds halves 175 and 176 are fitted with electrical heating resistors 208 connected, together with heating element 200 and motor 190, to an external electrical power source (not shown) by means of a connector 209 located outside mold 174 and connected, in sliding manner, to a power supply and control data transmission rail 210 extending along rail 156.

As shown in FIG. 11, station 160 comprises a portal or superstructure 211 through which run rails 156 and which is fitted with a locking device 212 for arresting each carriage 154 in a given loading/unloading position underneath portal 211.

With a carriage 154 in the said loading/unloading position, its respective curing unit 153 is positioned with its top mold half 176 directly beneath a lifting device 213 comprising a magnetic head 214 and an actuating device 215 supported on the upper crosspiece of portal 211 and designed to move head 214 from a lowered position, contacting top mold half 176 (connected to bottom mold half 175), into a raised position.

With a carriage 154 in the said loading/unloading position, respective curing unit 153 moves into position with extension 179 of its outer ring 178 engaging a pair of horizontal actuators 216 which may be operated for turning outer ring 17 on mold 174 between two operating positions for respectively opening and closing bayonet joint 177. Also, each of holes 187 on bell 185 is located over a respective actuator or vertical hydraulic cylinder 217 mounted in fixed manner underneath portal 211 and designed to move piston 194 between a normal lowered position and a raised extraction and loading position. Finally, valve 207 is located over an ejector 218 on a pneumatic loading circuit, which ejector is located beneath portal 211 and designed to move, by virtue of actuator 219, between a lowered idle position and a raised position. In the latter position, ejector 218 engages valve 207 in such a manner as to open it, exhaust the said curing media inside unit 153 and subsequently inject a new supply of curing media.

As shown in FIGS. 1 and 10, robot 10 is located adjacent to portal 211 and includes a supporting body 220, and a platform 221 mounted on supporting body 220 and turns in relation to the same about a vertical axis. An articulated arm 222 is mounted on platform 221 for moving, in relation to the same and in a substantially vertical plane, a known type of "tulip" shaped fastening device 223 having a plurality of expandable petals designed to engage the bead area of green tire 5 or cured tire 14.

Finally, curing department 11, as a whole, is located within a thermally insulated outer covering or enclosure 225 for retaining the heat given off by units 153 during curing.

In plant 1, as previously described, each of the extruders 31, 32, 38, 58, 101, 139 and 140 receives, as already stated, a respective final mix from a respective continuous mixer 3 loaded with a given amount of a respective masterbatch and with given amounts of curatives and appropriate chemical compounds withdrawn from respective containers 16 in storage area 2. The various ingredients constituting a given final mix may be measured and mixed manually or using known types of semiautomatic weighing systems mounted on feed-boxes 17 of containers 16. As already stated, however, measuring and mixing are preferably performed using known types of automatic systems controlled by central control unit 15.

Concerning operation of continuous mixers 3, it should be pointed out that each final mix is formed by the respective continuous mixer 3 in any appropriate form for supplying the respective extruder, but always in such quantities as to enable the continuous supplying of the said extruder with no stock pileup. In other words, each final mix may be produced, for example, in the form of a continuous strip, which may either be fed continuously to the inlet of the respective extruder or, as shown in FIG. 1, fed onto a respective support carriage or into a container for forming a relatively small batch which, once completed, may be fed directly to the respective extruder. The latter system is always preferable in cases where the output capacity of each continuous mixer differs from that of the respective extruder.

In other words, continuous mixers 3 are operated in a substantially continuous manner for meeting the immediate demand of the respective extruders, and the material coming out of continuous mixers 3 is transferred either continuously or within a relatively short space of time to the respective extruder inlets. In this way, i.e. producing in continuous mixers 3 only the amount of material required at that particular time by the respective extruders, the extruders may be supplied with material preserving a relatively high percentage of the heat absorbed during mechanical mixing of the material inside continuous mixers 3.

For example, a final mix having a temperature of around 100° C., at the output of respective continuous mixer 3, may easily be transferred to the respective extruder input at an initial temperature of around 70°-80° C.

Feeding an extruder with a final mix at the aforementioned temperature undoubtedly affords a number of advantages by eliminating the need for preheating the mix prior to extrusion; enabling the use of far less powerful extruders than normally required for processing the same final mix starting at room temperature; reducing the amount of lubricants and fluidizers normally added to the final mix prior to extrusion; and considerably reducing the possibility of scorching.

The operation of assembly department 4 for green tires 5 will now be described starting from the formation of a carcass 8 on drum 20 and 77, for example drum 20, which for description purposes is located within section 6.

A carcass 8 is manufactured on drum 20 as follows:

As best seen in FIG. 2, first of all, an operator takes hold of the front edge of a piece 46 of elastomeric strip 26 on table 23 and feeds it onto drum 20, which is turned by shaft 21 until piece 46 is fully wound about the said drum 20. The opposite ends of wound piece 46 are then spliced together by the operator who, after turning drum 20 through a given initial angle, feeds on to the said drum 20 a portion 67 of textile strip 48 from table 24.

Subsequent to a full turn of drum 20, portion 67 is wound completely on to drum 20 and its ends are spliced together to form the body ply of carcass 8.

It should be pointed out that, inside the material wound on to drum 20, only two splices exist, one on the inner layer of elastomeric material, and the other on the external body ply, and that the said two splices are spaced a given distance apart, said distance being adjustable by the maker regulating the aforementioned initial rotation angle of drum 20.

The same does not apply to first stage tires manufactured in known prior art tire plants in which, to the said two splices, may be added, in totally random manner and in a totally random location, a further splice on the body ply, by virtue of the said body ply being obtained from a coated composite textile strip obtained by transversely splicing together a number of strip portions. Should the said further splice be located within 15-10 centimeters of either of the aforementioned splices, the respective tire must be rejected, or the material manually adjusted during the assembly process, thereby reducing productivity.

Further grounds for rejecting carcasses manufactured in known plants consist in the fact that the innerliner, consisting substantially of butyl rubber, presents, as it cools, both overall and totally unpredictable local shrinkage resulting in local swelling of the innerliner, which may induce totally unacceptable vibration on the finished tire. This drawback is overcome in the described plant 1, in that, as already stated, the particular structure and, therefore, the particular travelling direction of coated textile strip 48 in the direction of arrow 56 enable direct extrusion of strip 26 on to drum 20, and permit drum 20 to be fed with pieces 46 having an innerliner 27 at a relatively high temperature, normally about 80°-90° C., and on which the said unpredictable local shrinkage has not yet taken place. Innerliner 27 is therefore perfectly flat and maintained so by respective superimposed body ply portion 67 which, being internally reinforced by cords 52, prevents any deformation of innerliner 27 as it cools.

Once the body ply has been formed, an operator shifts hoops 74, fitted beforehand with the respective beads (not shown), from the raised idle position into the lowered working position, and then shifts slide 72 from the idle position into the working position.

As slide 72 is shifted, hoops 74 and respective beads pass over drum 20, on the outside of the body ply, passing between the front ends of tables 23 and 24 and drum 20. Drum 20 is then operated in known manner so as to secure the noted beads which are released in position by respective hoops 74 which, upon opening, allow slide 72 to return to its idle position.

At this point, mention should be made of a number of further important advantages deriving from the supply direction of coated textile strip 48 and the manner in which portions 67 are obtained from it.

Firstly, only one coated textile strip 48 is required for manufacturing tires of different size but with the same inside diameter. For changing size, cutting station 65 needs simply be set so as to produce portions 67 of different width, but still of length W equal to both the width W of strip 48 and the circumferential development of drum 20.

Such does not apply to known plants in which changing size, with the same inside diameter, automatically involves changing the coated composite strip from which the body plies are obtained.

A further advantage relates to the existence on the market of numerous types of tires comprising two or more superimposed body plies, usually of decreasing width.

Manufacturing such tires in known plants is always a problem, due to the fact that the building drum must be supplied with a different coated composite strip for each body ply, which usually entails constructing a specific plant or at least a specific department for each type of multiple-ply tire being produced.

This problem does not exist in plant 1, in that, for switching from a one-ply to, for example, a two-ply tire, cutting station 65 need simply be controlled in such a manner as to produce, for each tire, in a first cutting operation, a first portion 67 equal in width to the first body ply, and, in the next cutting operation, a second portion 67 equal in width to the second body ply, though still employing the same coated textile strip 48.

A final consideration relates to the fact that direct extrusion of innerliner 27, made possible by the feed direction of coated textile strip 48, enables the formation of innerliner 27, not in the form of a flat strip, but in the form of a strip which, as shown in FIG. 4, presents two contoured areas or thickened longitudinal portions 150 on the portions of innerliner 27 subjected to greater bending during the formation of carcass 8. These portions are usually located on the opposite side edges of tread 95 and, during the formation of carcass 8, are subjected to stretching resulting in a considerable reduction in thickness. On an innerliner consisting of a flat rectangular-section strip, the necessity of increasing the thickness of the strip, so as to compensate for thinning of the said major stretch portions, involves considerable material waste owing to the fact that the lesser stretch portions of the said flat innerliner are obviously also oversized. The presence of contoured areas 150, made possible by direct extrusion of innerliner 27, provides for minimizing the thickness of the low-stress portions of innerliner 27, thus enabling important advantages in terms of cost, by saving on material, and operation, by reducing the weight of the finished tire.

Once the said beads have been assembled on drum 20, platform 75 (FIG. 1) or turret 86 (FIG. 2) is turned 180° about its own axis, during which rotation, drum 20 commences the shaping of carcass 8, and, at the end of which rotation, drum 20 occupies the position previously occupied by drum 77 which move into position facing tables 23 and 24.

In its new position, drum 20 is located inside second-stage section 7, facing and coaxial with collapsible drum 78 onto which line 91 has fed, in succession, tread plies 93 and 94, and line 92 has fed tread 95 for forming annular package 9.

Figure 8:
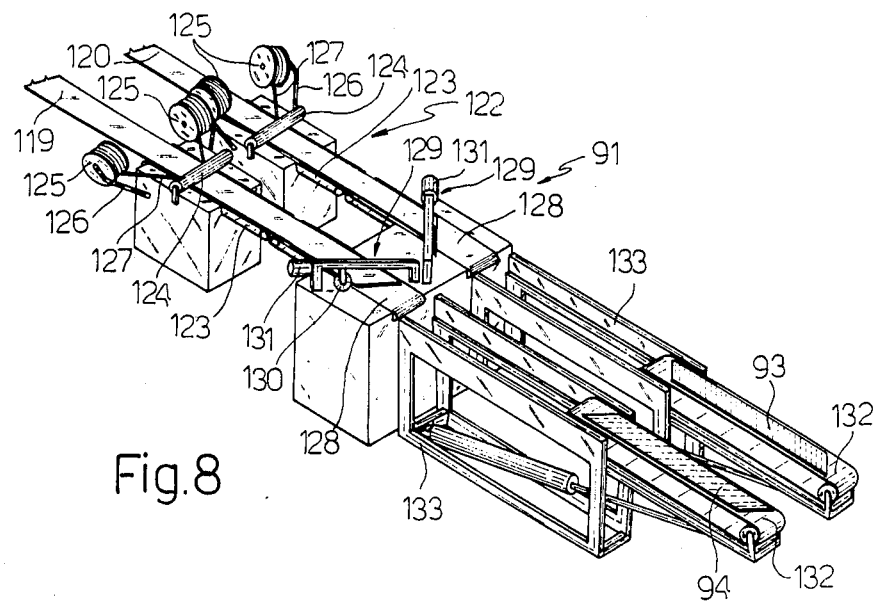
FIG. 8 shows an enlarged view in perspective of a second portion of the processing line in FIG. 7.

In connection with line 91, as best seen in FIGS. 7 and 8, it should be pointed out that, generally speaking, of each pair of successive portions of strip 103 produced by means of cutting device 114, one is sent along conveyor 110 and spliced by splicing device 117 to the tail end of reinforced composite strip 119, whereas the other is sent along conveyor 111 and spliced by splicing device 117 to the tail end of reinforced composite strip 120.

The portions of wire 97 inside reinforced composite strips 119 and 120 extending along conveyors 110 and 111 are all arranged parallel with one another and with rail 118, and form, with the aligned longitudinal axes of conveyors 110 and 111, an angle equal to that between arrows 109 and 112. When strip 120 is turned over, however, by device 121, the portions of wire 97 inside the portion of strip 120 extending along respective conveyor 128 are inclined the opposite way to the portions of wire 97 inside the corresponding portion of strip 119.

Consequently, the inner reinforcements of tread plies 93 and 94 are oppositely angularly inclined.

Once separated from respective strips 119 and 120 by respective cutting stations 129, tread plies 93 and 94 are carried off by respective conveyors 132 which, moving on respective frames 133, feed them one after the other onto drum 78 where they are covered with tread 95 fed onto drum 78 by conveyor 134 on line 92.

As both tread plies 93 and 94 and tread 95 are formed by extrusion and fed directly onto drum 78, annular package 9 is hot-assembled, thus ensuring excellent adhesion of tread plies 93 and 94 to tread 95, with the resulting annular package 9 normally having a temperature of around 80°–90° C.

Annular package 9, once formed, is released by collapsible drum 78 and gripped externally by transfer ring 83, which then moves along crosspiece 82 from a first position, wherein ring 83 is located concentric with drum 78, to a second position, wherein ring 83 is located concentric with drum 20.

When ring 83 reaches the said second position, drum 20 continues, in known manner, to shape carcass 8, until the outer surface of the respective body ply adheres to the inner surface of the belt consisting of tread plies 93 and 94, and sidewalls 30 are adhered onto the side edges of tread 95 to produce a finished green tire 5.

After being stitched with a known type of stitching device (not shown), said green tire 5 is grabbed by transfer ring 83 which, by moving along crosspiece 82, unloads tire 5 from drum 20 and releases it in a central position between drums 20 and 78 in which tire 5 may be grabbed by robot 10 and transferred to curing department 11.

With reference to the above, it should be noted that, since both carcass 8 and annular package 9 were assembled at high temperature, the resulting finished tire 5 has a relatively high temperature of about 70°–80° C. when it is transferred to curing department 11.

In general, a finished green tire 5 is grabbed by robot 10 and transferred to curing department 11 after robot 10 has unloaded a cured tire 14 from unit 153 which, after having performed its curing cycle, reaches station 160 and is locked by locking device 212 beneath portal 211.

With unit 153 in the loading/unloading position beneath portal 211, its respective connector 209 engages a section 230 of rail 210, said section 230 enabling only the transmission of control signals, and no supply of electrical power to unit 153.

Ejector 218 is raised for releasing the pressurized curing media charge inside unit 153, after which, horizontal actuators 216 are activated so as to turn ring 178 and open bayonet joint 177, and lifting device 213 is moved down so as to engage magnetic head 214 with top mold half 176. Mold 174 is then opened, by lifting up magnetic head 214 and top mold half 176. At the same time, actuators 217 are operated for pushing up piston 194 which performs a dual function by first deforming inner tube or curing bladder 198 into a "tulip" shape and extracting it from cured tire 14, and then lifting tire 14 out and over bottom mold half 175 into a position in which tire 14 may be grabbed by robot 10 and transferred thereby onto conveyor 12.

As already stated, robot 10 then grasps a finished green tire 5 off transfer ring 83 or a conveyor (no shown) associated therewith, and after conveying the same, releases it onto open bottom mold half 175, specifically onto annular body 184 on piston 194 held up by actuators 217. Actuators 217 are then lowered for lowering piston 194, which performs a dual function by first reinserting annular body 184 inside respective groove 183 and placing green tire 5 onto bottom mold half 175, as well as releasing inner tube 198 which is thereafter supplied by ejector 218 with a relatively low-pressure "shaping charge" for inflating inner tube 198 and inserting it inside green tire 5.

At this point in time, top mold half 176 is lowered onto bottom mold half 175 and released by magnetic head 214, with actuators 216 being operated for closing bayonet joint 177. The rest of the curing media charge is injected by ejector 218, and unit 153, now fully released, is allowed to run down, by force of gravity, along section 169 of portion 159 of circuit 157, by releasing locking device 212.

Downward travel of unit 153 along section 169 causes respective connector 209 to hook up automatically to the conducting portion of rail 210, and also activates resistors 208, heating element 200 and fan 189 for commencing the curing process.

Rails 156, extending along circuit section 169, are usually occupied by further units 153 resting against one another and against a locking gate 231 at the entry to lift 171 designed to transfer units 153, one at a time, from section 169 to section 170, at a rate depending on the required curing time.

Travelling by force of gravity along section 170, unit 153 comes to circuit portion 161 and runs onto whichever one of branches 162 and 163 is held open by switching device 164.

After travelling along branch 162 or 163, unit 153 proceeds by force of gravity through intersection 167, along an initial portion of circuit section 169, and stops against a locking gate 229 which opens to let one unit 153 at a time into station 160 where it is stopped against locking device 212.

The time taken for any unit 153 to travel the whole circuit 157 is regulated mainly by central control unit 15 controlling lift 171, in such a manner as to exactly equal the time required for curing its tire 5.

Consequently, upon arrival of a unit 153 in station 160, its respective cured tire 14 may be unloaded so as to enable unit 153 to commence a new cycle.

As shown in FIGS. 1 and 10, a few units 153 are kept idle by locking device 168 on whichever one of branches 162 and 163 is not being employed at the time. During normal operation of curing department 11, such units may be set up for receiving tires of different design etc., from tires 5 being processed at the time in curing department 11, thus enabling production change by simply operating locking device 168 and switch device 16 without introducing, in practice, any downtime.

Curing department 11 in plant 1 clearly affords a number of advantages in terms of thermal energy savings. In addition to curing department 11 being supplied by department 4 with finished green tires 5 at a temperature of around 70°–80° C. instead of room temperature, the heat given off by curing units 153 is retained by outer casing 225 and partially yielded to waiting units 153 which, when utilized, are thus already preheated and require relatively little energy for reaching the curing temperature, as stated, of around 200° C.

From the energy standpoint, curing department 11 therefore conforms ideally with the primary characteristic of plant 1 as described and the method employed by the same, said characteristic consisting in producing finished tires 14 with relatively little consumption of thermal energy as compared with that required for producing tires in plants known as of the present.

As already mentioned, such energy savings are provided for by a combination of various factors, such as:
producing just the right amounts of final mixes to meet the requirement of the extruders, thus enabling the final mixes to be hot-fed to the extruders;
direct extrusion of semifinished products in the form of continuous strips, which are successively cut to produce the various tire component elements, thus enabling hot tire assembly and the production of finished green tires having a relatively high temperature;
direct supply of the said relatively hot green tires to the curing department;
the structure of the curing department itself which, with independent mobile units having their own heating systems and systems for internally circulating heat exchange fluid, provides for dispensing with centralized supply and heating systems which, in addition to involving considerable expenditure, also provide for relatively poor thermal efficiency.

In short, it may safely be said that the outstanding thermal efficiency of plant 1, as described, substantially derives from the fact that the thermal energy initially transmitted to the materials during at least part of the mechanical processing they are subjected to, e.g. during extrusion and/or mixing, instead of being entirely dispersed during interim stages in which the material is cooled down to room temperature, is at least partially retained inside the finished green tire entering the curing department.

Production rates and/or layout requirements may, of course, involve partial alteration of plant 1 as described herein and of the method employed by the same, without, however, departing from the scope of the present invention. For example, it may be necessary to introduce cooling stages between the preparation and extrusion of at least some of the final mixes. Likewise, it may be necessary to produce some of the semifinished products using methods other than direct extrusion, e.g. calendering, and to wind the resulting semifinished products onto a reel from which they are cold-fed onto the tire building drum. Nevertheless, the main teaching of plant 1 as described herein consists in the fact that:
a tire manufacturing plant enables considerable saving in thermal energy only when designed in such a manner as to enable the production of as many semifinished products as possible by direct production, such as extrusion, and direct hot feeding of the so obtained semifinished products onto a tire building drum; and in the fact that:
such energy savings may be further improved by making maximum possible use, for producing the said final mixes, of mixers having their respective outputs connected in substantially direct and hot manner to inputs of a respective continuous user such as an extruder.

It should be pointed out at this point that energy saving is not the only advantage afforded by plant 1 as described herein. The various factors already mentioned as being responsible for such energy savings also provide for extremely fast throughput from the masterbatches to the finished tire. Experiments have shown that, employing continuous mixers supplying respective extruders in substantially direct manner, with said extruders in turn hot-feeding respective semifinished products straight onto a tire building drum to produce a green tire which is hot-fed directly to a curing department, a finished tire can be produced in about thirty minutes starting from the respective masterbatches.

Such an extraordinarily short space of time between the production of a finished tire and the initial processing of its component materials provides, on the one hand, for eliminating any mishaps caused by aging, and, on the other, for employing a computerized loop control unit.

In other words, by inspecting a finished tire as it comes out of the curing department, the inspection results may be employed for automatically controlling the operating parameters of the various departments in the plant, in such a manner as to eliminate any detected errors. Such a procedure, which would be unthinkable in known plants in which the equivalent time span may range over several weeks, enables errors to be limited to a maximum of thirty minutes' worth of production.

Finally, direct in-process transfer of semifinished products from one department to another in the plant enables the various interim storage areas to be dispensed with entirely, thus eliminating all the problems and overhead costs, connected with such storage.

From the foregoing description and the operational discussion, when read in light of the several drawings, it is believed that those familiar with the art will readily recognize and appreciate the novel concept and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes or the like without departing from the spirit and scope of the invention with the latter being determined solely by reference to the claims appended hereto.

What is claimed is:

1. A method of hot-forming tires including a number of component elements, each of said component elements being formed at least partially from a respective final mix of non-precured elastomeric material, said component elements defining an internal carcass and an external annular package assembled together in a green tire assembly department including at least one tire building drum, said carcass comprising an impermeable inner layer and at least one outer body ply, and said external annular package comprising a number of superimposed tread plies and an outer tread wherein the method includes the steps of:

(a) producing final mixes of elastomeric material at a temperature greater than room temperature so that each said mix will absorb thermal energy, wherein at least one of said final mixes is obtained by mixing respective masterbatches with respective chemical components within respective mixers, said mixing including the transfer of thermal energy to at 1 east one final mix to impart a temperature to said at least one final mix, at the output of said mixer, which is greater than room temperature;

(b) feeding each said a least one final mix for the continuous production of a continuous strip prior to dissipation of the thermal energy which is imparted to each at least one final mix during step (a);

(c) forming at least some of said elements by cutting semifinished products, each in the form of respective continuous strips produced by direct continuous production of the respective final mixes of step (b), said direct continuous production involving a given transfer of thermal energy to each of said continuous strips and conferring to each of said strips an output temperature greater than room temperature;

(d) hot-feeding at least some of the directly produced and cut continuous strips directly onto said one tire building drum for assembling a finished green tire on said drum, wherein said hot-feeding of at least some of said produced and cut continuous strips preserves at least part of the thermal energy imparted to said produced and cut continuous strips during said producing step and said forming step, so that each of said cut continuous strips are maintained at a total final temperature greater than room temperature;

(e) subjecting each finished green tire to a curing operation prior to dissipation of the thermal energy imparted to said continuous strips during said forming step, and prior to dissipation of the thermal energy imparted to said mixes during said producing step.

2. A method as claimed in claim 1, wherein said mixers are continuous mixers.

3. A method as claimed in claim 1, wherein each of said continuous strips produced by direct continuous production of respective final mixes is produced by extrusion.

4. A method as claimed in claims 1, 2 or 3, wherein each tire subjected to said curing operation is inspected for obtaining data pertaining to at least one performance characteristic of each said tire, which data is subsequently used by a computerized central control unit for controlling said mixing and curing operations.

5. A method as claimed in claims 1, 2 or 3, wherein each of said tires subjected to a curing operation includes an outer body ply which comprises a textile layer coated with elastomeric material, said textile layer including parallel textile cords lying in radial planes on each of said tires, with each said outer body ply being formed from a strip of textile material which is substantially equal in width to the circumferential development of a tire building drum, and wherein said cords constitute the axial warp of said textile strip; said textile strip being coated with elastomeric material to produce a rubber-coated textile strip, the coated textile strip being fed axially towards said tire building drum in a direction which is substantially parallel to the axis of rotation of said drum, and thereafter being subjected to a transverse cutting operation for producing axial portions which are substantially equal in length to the axial development of said carcass, wherein said axial portions are fed directly onto said tire building drum.

6. A method as claimed in claim 5, wherein said textile strip is coated by direct extruding two layers of elastomeric material onto opposite surfaces of said textile strip.

7. A method as claimed in claim 5, wherein said impermeable inner layer includes a central innerliner, two lateral abrasion strips and two sidewalls, said method including extruding said inner layer directly onto a pre-assembly table adjacent to said tire building drum, for producing a continuous strip of elastomeric material having a longitudinal axis which is substantially perpendicular to the axis of rotation of said tire building drum, said continuous strip being equal in width to the axial development of said carcass; said method including transversely cutting said continuous strip of elastomeric material into axial portions substantially equal in length to the circumferential development of said carcass, and feeding axial portions axially and directly onto said drum so as to be wound about the drum so as to form said impermeable inner layer.

8. A method as claimed in claim 7, further comprising extruding said innerliner in the form of a flat strip having two longitudinal contoured areas constituting the portions of said innerliner subjected to maximum transverse bending stress during formation of said carcass.

9. A method as claimed in claim 5, further comprising forming said tread plies from a strip of metal wires arranged axially and side by side, coating said metal wires by direct continuous production, with elastomeric material on opposite surfaces of said strip of metal in such a manner as to form a reinforced strip, and thereafter subjecting said reinforced strip to a transverse cutting operation at a given angle, and to a splicing operation, so as to produce a number of composite strips, each of said composite strips being internally reinforced with metal wires forming said angle in relation to the longitudinal axis of said composite strip, wherein each reinforced composite strip is cut transversely at said angle so as to produce respective tread plies which are fed successively and directly to the assembly department.

10. A method as claimed in claim 5, wherein said tread is formed by continuous extrusion of a strip of elastomeric material which is cut into portions which are fed successively and directly for assembly into a finished green tire.

11. A method as claimed in claim 5, wherein each of said green tire is transferred directly after assembly to a curing station by a transfer device.

12. A method as claimed in claim 11, wherein each of said tires is cured within a thermally insulated outer covering or enclosure, wherein each finished green tire is subjected to a curing operation performed inside said enclosure and involving the use, for each said green tire, of a respective curing unit, means for loading said green tire into said curing unit, and means for unloading a cured tire from said curing unit; each curing unit being mounted in a mobile manner on guide means defining a path extending between said loading and unloading means, and being connected in independent and releasable manner to said guide means; each curing unit incorporating a mold for a respective green tire, a loop circuit for receiving a given charge of heat exchange fluid under pressure, a thrust device for force-circulating said fluid charge along said loop circuit, and individual elements for heating both said mold and said fluid charge.

13. A method as claimed in claim 12, wherein, halfway between said loading and unloading means, said path comprises at least two parallel branches, with switching means being provided for excluding one of said branches.

14. A method as claimed in claim 13, wherein said loading and unloading means include a loading/unloading station, said path comprising a loop extending through said loading/unloading station, and said loading/unloading station being engaged by said transfer device for loading each green tire onto a respective curing unit and for unloading a corresponding cured tire off of each said curing unit.

15. A method as claimed in claim 14, wherein said transfer device means, said means for loading, and said means for unloading constitute a robot.

* * * * *

UNITED STATES PATENT AND TRADEMARK OFFICE
CERTIFICATE OF CORRECTION

PATENT NO. : 4,877,468

DATED : October 31, 1989

INVENTOR(S) : Karl J. Siegenthaler

It is certified that error appears in the above-identified patent and that said Letters Patent is hereby corrected as shown below:

Column 5, line 45

"ar" should read "are"

Column 11, line 68

"17" should read "178"

Column 15, line 10

"move" should read "moves"

Column 16, line 32

"(no" should read "(not"

Column 19, line 26

"1 east" should read "least"

UNITED STATES PATENT AND TRADEMARK OFFICE
CERTIFICATE OF CORRECTION

PATENT NO. : 4,877,468

DATED : October 31, 1989

INVENTOR(S) : Karl J. Siegenthaler

It is certified that error appears in the above-identified patent and that said Letters Patent is hereby corrected as shown below:

Column 20, line 24

"direct" should read "directly"

Signed and Sealed this

Fifth Day of March, 1991

*Attest:*

HARRY F. MANBECK, JR.

*Attesting Officer*  *Commissioner of Patents and Trademarks*